April 30, 1935.  T. WARDLEY  1,999,827
AUTOMATIC WEIGHING APPARATUS FOR GLASSWARE
Filed Sept. 22, 1931  6 Sheets-Sheet 1
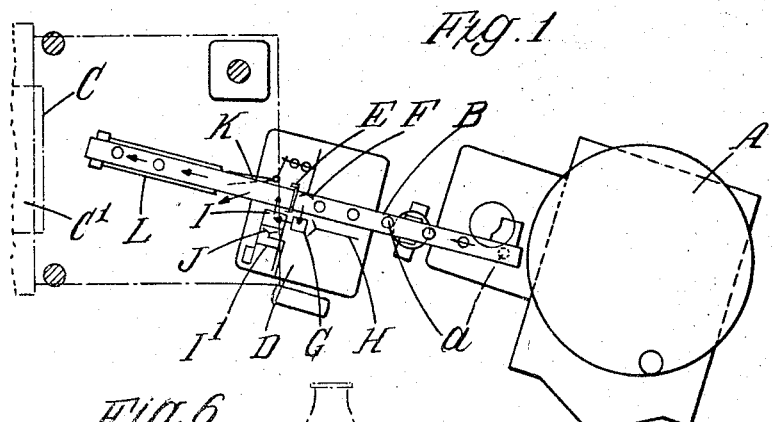
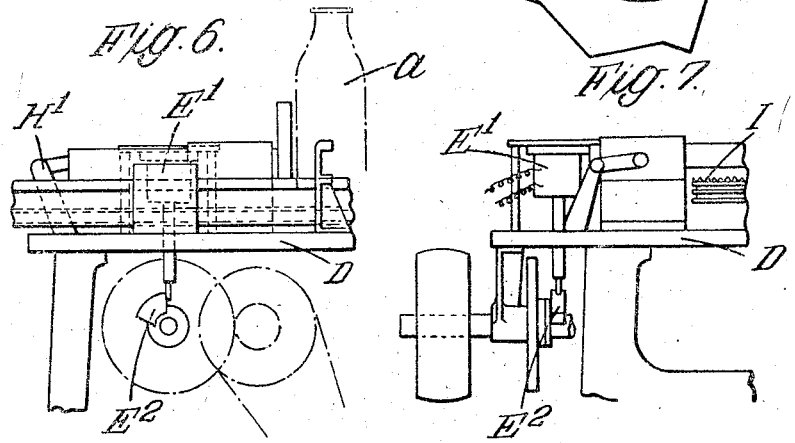
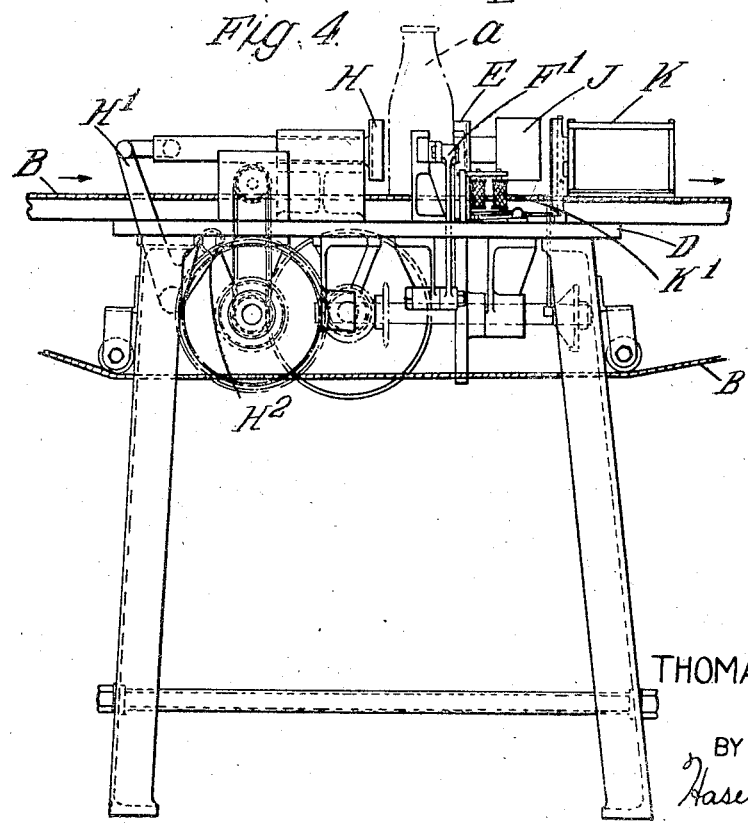
THOMAS WARDLEY
INVENTOR
BY
Haseltine, Lake & Co.
ATTORNEYS April 30, 1935.  T. WARDLEY  1,999,827
AUTOMATIC WEIGHING APPARATUS FOR GLASSWARE
Filed Sept. 22, 1931    6 Sheets-Sheet 2
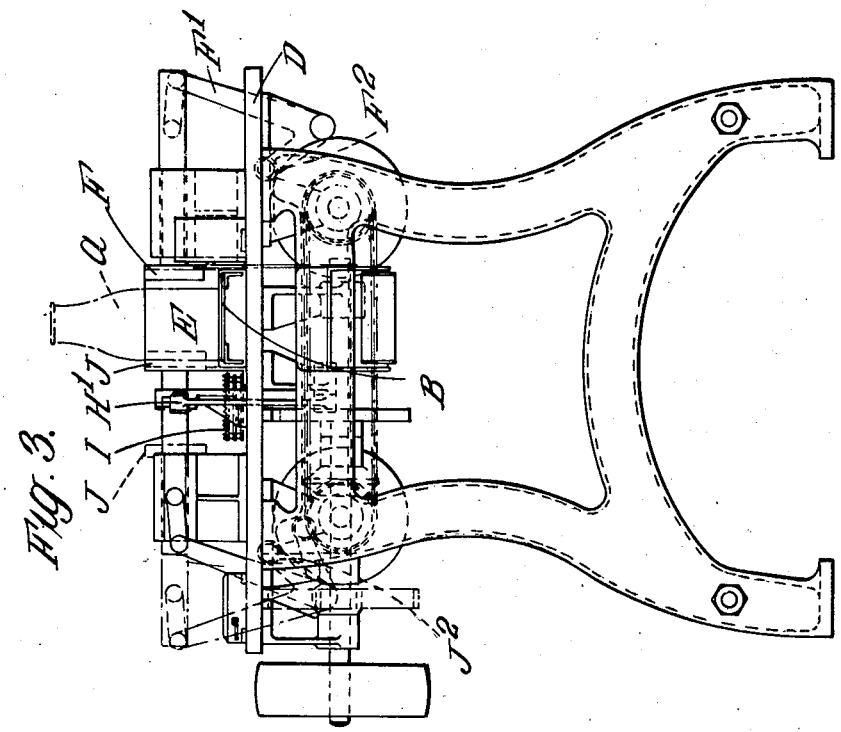
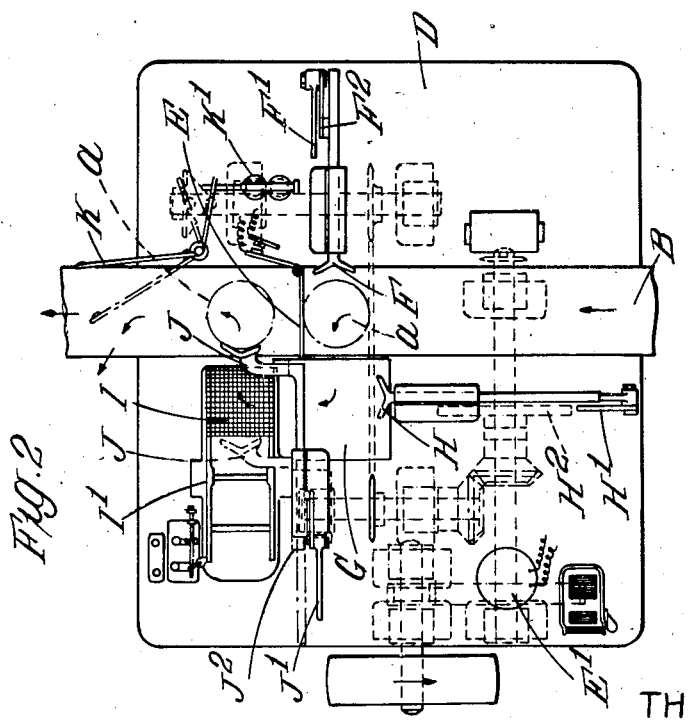
THOMAS WARDLEY
INVENTOR
Haseltine, Lake & Co,
ATTORNEYS April 30, 1935. T. WARDLEY 1,999,827
AUTOMATIC WEIGHING APPARATUS FOR GLASSWARE
Filed Sept. 22, 1931 6 Sheets-Sheet 3
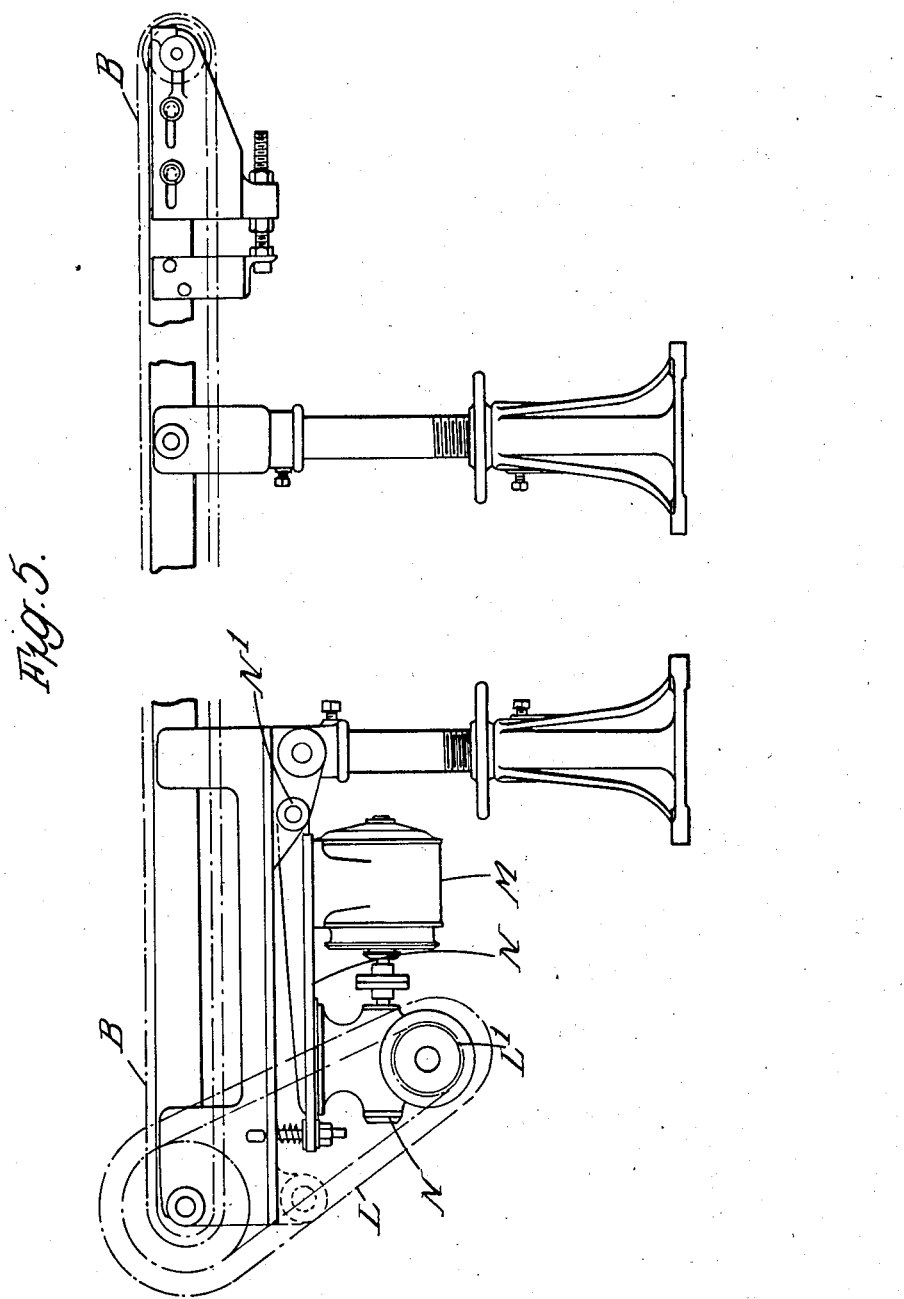
THOMAS WARDLEY
INVENTOR
BY
Haseltine, Lake & Co.
ATTORNEYS

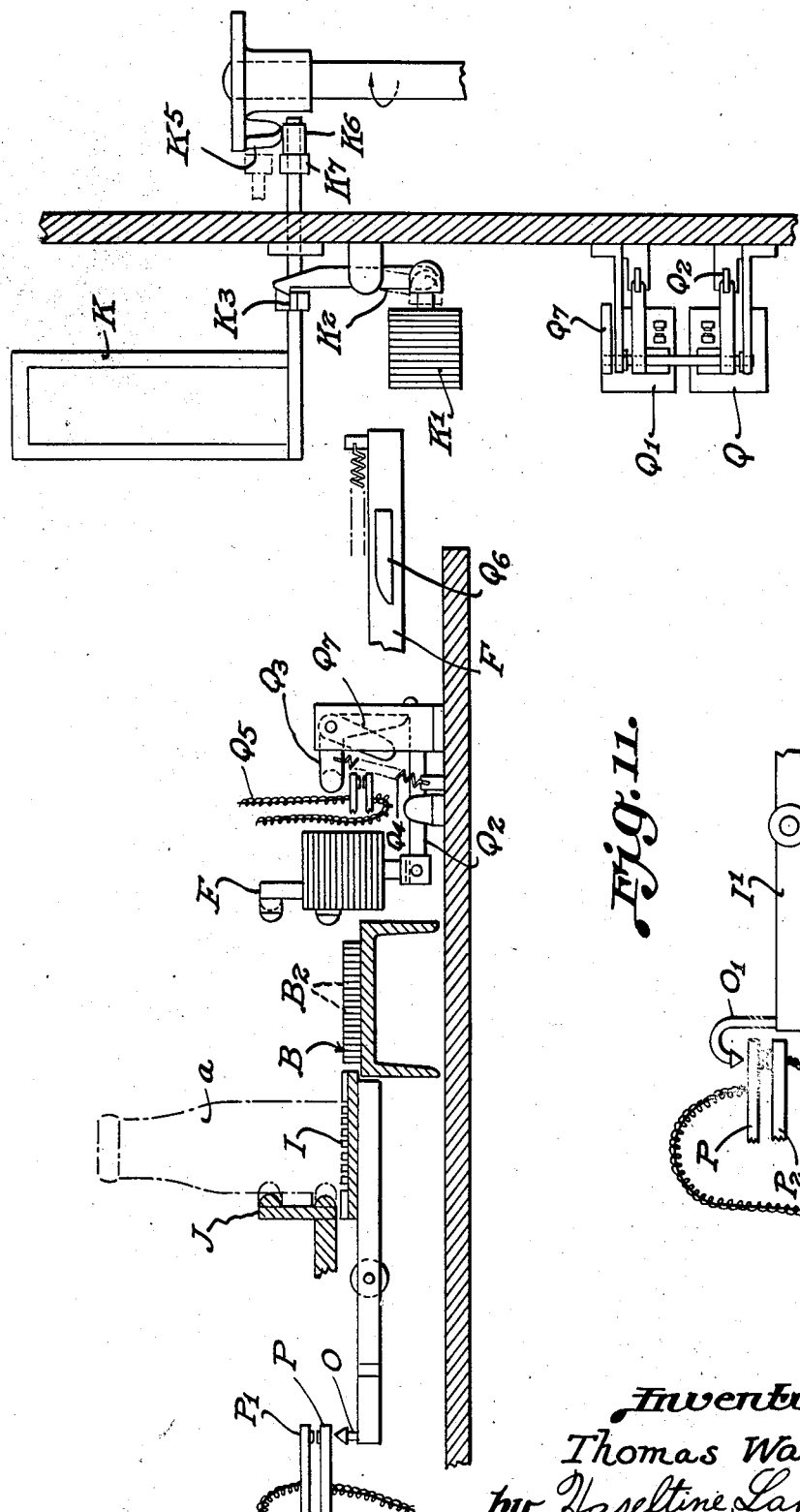

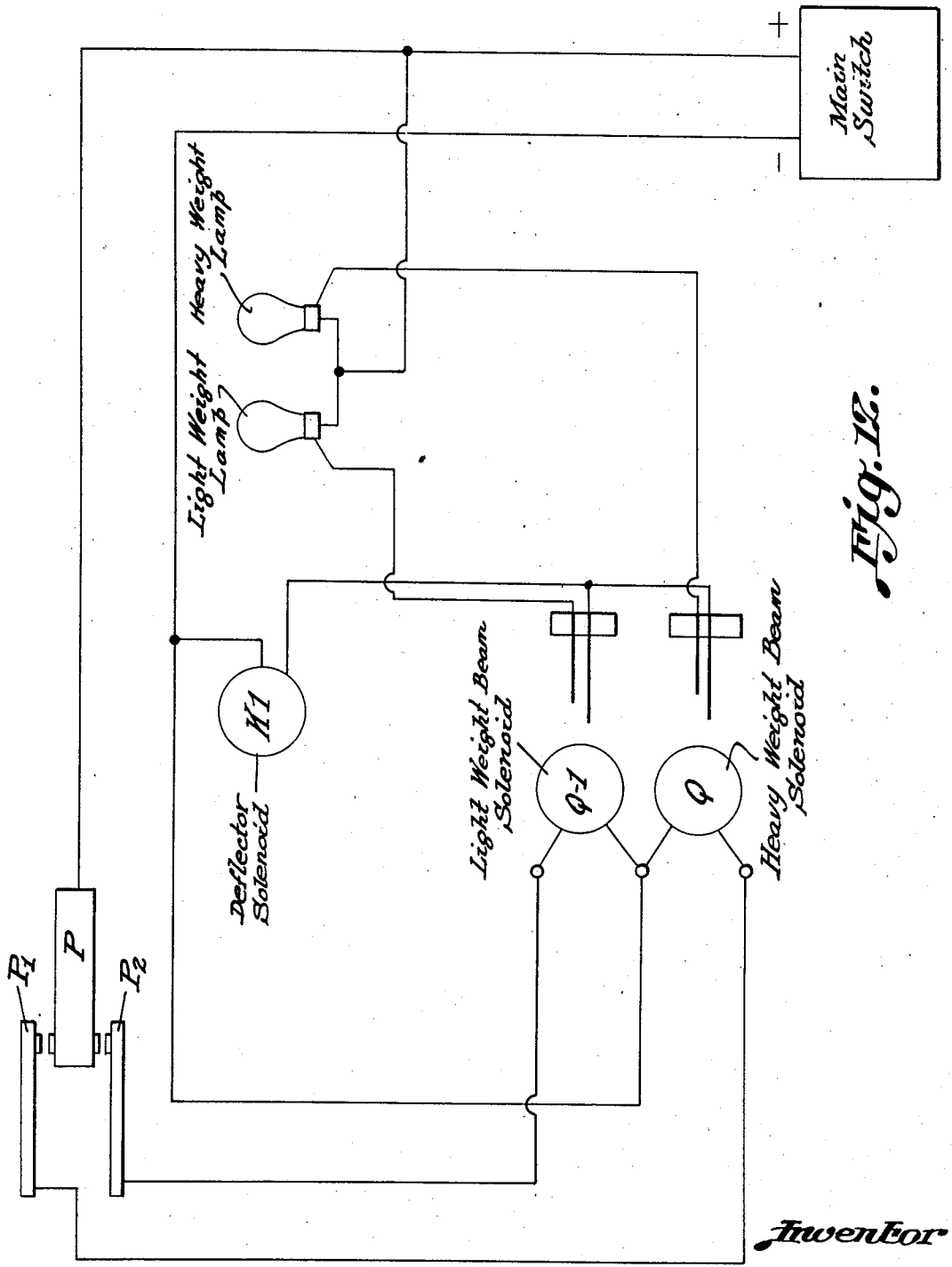

Patented Apr. 30, 1935

1,999,827

UNITED STATES PATENT OFFICE 1,999,827

AUTOMATIC WEIGHING APPARATUS FOR GLASSWARE

Thomas Wardley, Greenford, England

Application September 22, 1931, Serial No. 564,324
In Great Britain December 1, 1930

2 Claims. (Cl. 209—121)

This invention relates to the manufacture of glassware such as bottles, containers or other articles that have to be of accurate weight. With certain kinds of articles such as liquid containers or bottles, weight has some definite relation to capacity and if the weight is accurate or within predetermined limits of accuracy, the capacity is correct or to standard. The relation of weight and capacity applies especially with regard to milk or other liquid containers, which are made in different sizes, each size being intended to contain a specified measure or quantity, and it is desirable that the containers of any given size should be of the same capacity to ensure that the level of the specified measure or quantity of liquid should be as uniform as possible in close relation to the sealing discs or closures of the containers. The invention is not limited to the manufacture of articles where weight and capacity have to be considered, as it can be applied to the manufacture of glassware, where accurate weight only is the desideratum, such as for example pressed glassware, lenses, pavement lights, certain types of dishes etc. The term "articles" will therefore be used throughout this specification and in the claims to cover bottles containers and other types of glassware such as hereinbefore referred to. The chief object of the present invention is to provide automatic means for dealing with the articles of glassware during manufacture so as to ensure that the finished articles are all up to the required standard as regards weight and in some cases capacity. A further object of the invention is to enable the said means to be utilized for the purpose of enabling the supply of molten glass to the forming machine to be varied or corrected with a view to ensuring that the proper amount of molten glass is supplied for the production of an article of the required weight and in some cases capacity.

According to this invention the articles are automatically weighed individually as they are conveyed or transferred from the forming machine to the annealing leer, and only such articles which are of a predetermined weight or within a predetermined limit of accuracy as regards weight are allowed to proceed to the leer. The articles as they leave the forming machines are deposited on to a conveyor on which they may be carried in succession towards the leer and during their travel each article passes on to a weighing apparatus; if the article is of the correct weight, it is allowed to proceed to the leer, but if it is too heavy or too light, means preferably under the control of the weighing apparatus, are operated to reject the article and prevent it from travelling to the leer. The apparatus may be such that each article is automatically transferred from the conveyor on to a weighing table or the like, from which after being weighed it is automatically replaced on the conveyor, whence it is carried to the leer if of the correct weight, whilst if it is not of the correct weight, it comes into contact with a deflector which guides it off the conveyor, the said deflector being preferably actuated or controlled to assume the deflecting position by the aforesaid weighing table. The weighing operation which may be carried out whilst the articles of glassware are at a temperature above 500° C. may be such as to enable an indication to be given to show whether the articles are above or below the predetermined or required weight, thus enabling the operator to control the supply of molten glass to the forming machine according to requirements. The control of molten glass supplied to the forming machine may, however, be effected automatically.

In order that the said invention may be clearly understood and readily carried into effect, the same will now be more fully described with reference to the accompanying drawings, in which:—

Figure 1 is a diagrammatic plan illustrating the weighing apparatus associated with a conveyor at a position between the bottle making machine and an annealing leer.

Figure 2 is a plan of the weighing apparatus which is used for the purpose of the present invention, drawn to an enlarged scale.

Figures 3 and 4 are respectively an end view and a side view of the weighing apparatus illustrated in Figure 2.

Figure 5 is a side view of the conveyor (without the weighing apparatus) illustrating more particularly the driving means hereinafter referred to.

Figures 6 and 7 are fragmentary detail views hereinafter referred to.

Figure 9 is a sectional view of the parts shown in Figure 8 on line 9—9, while

Figure 10 is a side elevation of the same parts.

Figure 11 is a fragmentary front elevation of part of Figure 8 on line 11—11.

Figure 12 is a circuit diagram of the apparatus.

Throughout the views, the same reference characters indicate the same or like parts.

Figure 8:
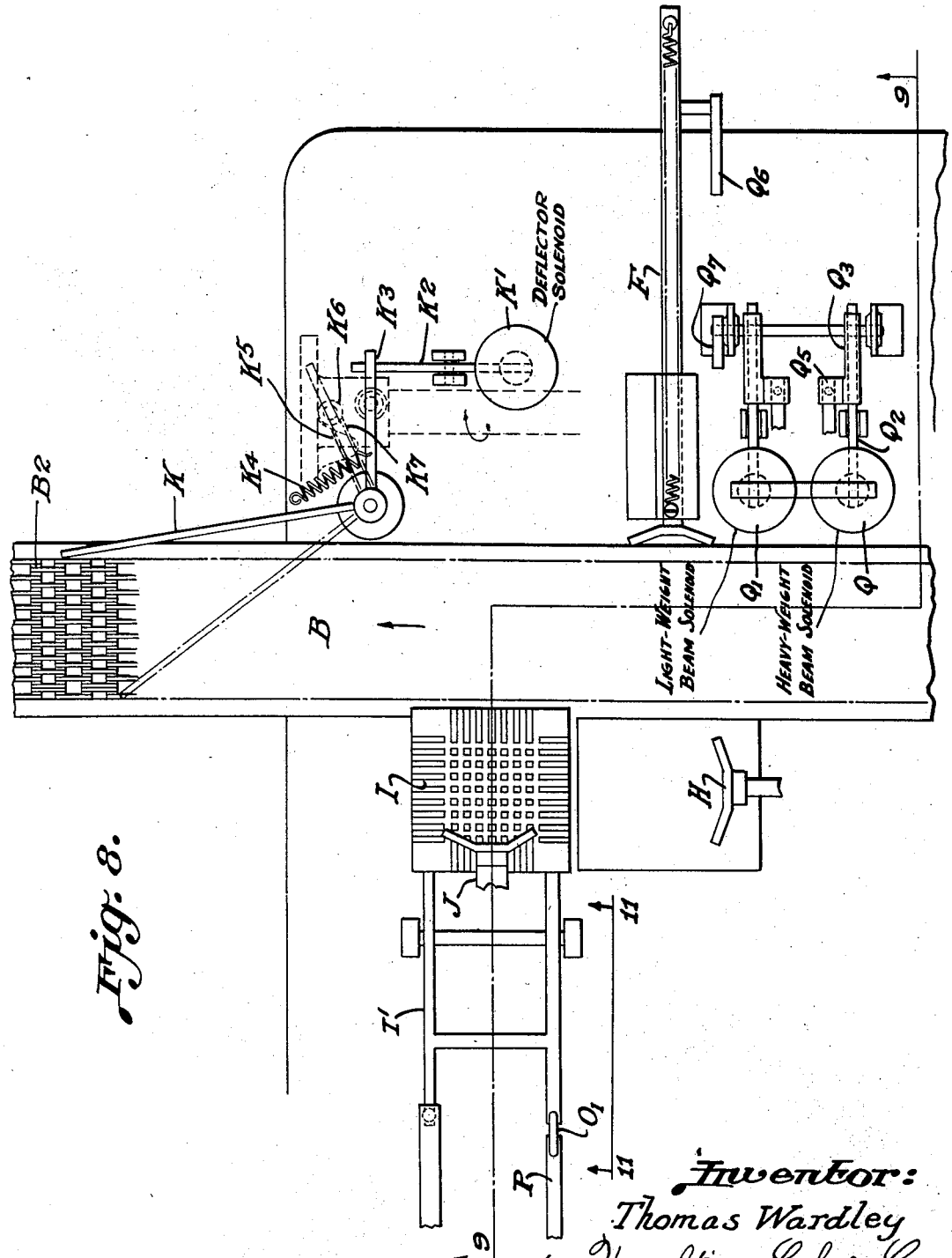
Figure 8 is an enlarged fragment of Figure 2 showing more detail.

A indicates the glassware forming machine, the articles produced in the present case being bottles or containers but hereinafter referred to as the articles a. The articles a are delivered or deposited on to an endless conveyor B so as to be carried by the latter towards an annealing leer C having an endless conveyor $C^1$ which carries the articles (of the correct weight) through the leer tunnel. D indicates generally the weighing apparatus which as shown in Figure 1 is interposed between the forming machine A and the leer C at any suitable position along the conveyor B. The operating mechanism of the weighing apparatus comprises suitable gearing situated below the table of the apparatus as shown in Figures 2, 3 and 4 and actuated in any appropriate manner for the purpose of bringing about the cycle of operations necessary for the weighing of each article. The articles a are carried in succession from the forming machine A by the conveyor until they move into contact with a tripper E disposed across the conveyor. The article in striking this tripper causes it to move and complete an electric circuit which energizes a solenoid $E^1$ for the purpose of enabling a single revolution clutch $E^2$ (see Figures 6 and 7) to cause the actuation of the operating mechanism of the weighing apparatus and thus bring about the cycle of operations necessary for the weighing of each article. Firstly in this cycle of operations a laterally movable bar or pusher F on one side of the conveyor and actuated by a lever $F^1$ and cam mechanism $F^2$ pushes the article a from its position on the conveyor in front of the tripper E on to a support G at the other side of the conveyor. The article is then pushed by a longitudinally movable bar or pusher H off the support G on to the table I carried by a weighing beam $I^1$, the bar or pusher H being actuated by a lever $H^1$ and cam mechanism $H^2$ at the appropriate moment. The weighing table I and the weighing beam $I^1$ are normally held in a definite or fixed position and if the article a which is placed thereon is of the correct weight, the table and beam do not move, but if the said article is too heavy or too light, the table and the beam move either downwardly or upwardly to a slight extent, this movement being utilized to operate electrical means, for controlling an angularly movable deflector hereinafter referred to, that prevents articles of the incorrect weight from travelling to the leer. The article after having been weighed, is pushed off the weighing table I on to the conveyor B on the other side of the tripper E, by means of another laterally movable bar or pusher J which is actuated by a lever $J^1$ and cam mechanism $J^2$. If the article which has just been moved from the weighing table I is of the correct weight, it is carried by the conveyor to the leer and it may be taken off by hand or by automatic means and placed on the leer conveyor $C^1$ at the entry end of the leer tunnel. If, however, the article which has just been moved from the weighing table is not of the correct weight, the upward or downward movement of the weighing table I during the weighing operation results in electrical means being actuated for the purpose of enabling a solenoid or the like $K^1$ to move a deflector plate or bar K from an inoperative position at the side of the conveyor into an inclined position across the latter as shown by the dotted lines in Figures 1 and 2 so that when the article of incorrect weight moves against or strikes the deflector plate, the latter guides the article as it is moved by the conveyor and deflects it off the latter preferably on to a chute leading to a suitable receptacle. After this operation the deflector K returns to its normal position at the side of the conveyor so as to be out of the path of movement of the articles.

If the article is too light, the upward movement of the weighing table I will enable an electrical circuit to be completed for illuminating a lamp of a certain colour, whereas if the table is moved downwardly under the weight of the article that is too heavy, another circuit is completed for enabling a lamp of another colour to be illuminated. In other words, if the glass article a is heavy, the beam $I^1$ will rise at the end opposite to plate I, and by means of a finger O will close an electrical circuit through two contacts P, $P^1$, thus energizing two similar solenoids $K^1$ and Q. In a similar manner, if article a is light, beam I will fall and through a contact $O^1$ and contacts P and $P^2$ will cause the energizing of solenoids $K^1$ and $Q^1$.

In operation, the solenoid $K^1$ lifts the latch $K^2$ to release lever $K^3$, which is under the action of spring $K^4$, while deflector K and the lever $K^3$ are attached to the same spindle, thus when lever $K^3$ is swung round under the action of a spring $K^4$ the deflector K is moved across the conveyor B as shown by dotted lines.

To return deflector K to normal, a cam and cam lobe $K^5$ revolve on the shaft and bear against a roller $K^6$ which is attached to an arm $K^7$ which is mounted on the same spindle as deflector K. Thus when arm $K^7$ is moved round, deflector K returns to the normal position, and the latch $K^2$ engages with lever $K^3$ ready for the next cycle.

When heavy weight beam solenoid Q is energized it lifts latch $Q^2$ releasing the lever $Q^3$, which under the action of spring $Q^4$ connects contacts $Q^5$, and closes the electrical circuit which lights the heavy weight lamp. In a similar manner, the light weight beam solenoid $Q^1$ is energized, and through its latch, levers, etc., causes a different electrical circuit to be closed and lights the lightweight lamp. To return the solenoids Q of $Q^1$ to normal, the cam $Q^6$ attached to pusher F moves forward and lifts an arm $Q^7$ which is attached to the same spindle as lever $Q^3$. Thus lever $Q^3$ moved against the action of spring $Q^4$, is re-engaged with latch $Q^2$, and the electrical circuit of the lamps is again opened. In this manner the operator on observing the illumination of the lamps can control the supply of molten glass to the forming machine so that in the case of the article being too light, more glass can be supplied and vice versa. The support G on to which the article A is pushed by the pusher F and also the surface of the weighing table I, may be constituted by a number of closely arranged projections to reduce heat transference and generally the construction of the weighing apparatus is such as to prevent or reduce heat transference from the article to the internal mechanism of the weighing machine. The conveyor B may be so constructed as to facilitate the movement of the articles off or on to the same, and it may also be such as to prevent undue heat transference from the article. For this purpose it may comprise a number of links similar to $B^2$, with flat or substantially flat tops arranged sufficiently close together to enable the articles to be firmly supported but spaced apart preferably in staggered relation to provide air spaces that prevent transfer of heat from the article to the conveyor. The speed of the conveyor may be varied to suit the particular type or class of glassware which is being dealt with, so as to ensure that the forming machine and the weighing apparatus operate in timed relation and for this purpose the conveyor may be actuated by means of a belt L (see Figure 5) driven from an electric motor M through reduction gearing N, one of the pulleys L¹ around which the endless belt L passes, being of the expanding type so that it can be adjusted to vary the speed of the belt. In order to maintain the belt under uniform tension, the aforesaid motor and the reduction gearing, which latter carries the expanding pulley, may be mounted on a plate O that is hinged at O¹ to a fixed part of the apparatus, so that when the pulley L¹ is adjusted, the weight of the plate and the parts carried thereby, causes the pulley to assume a position in which the belt is properly tensioned.

What I claim and desire to secure by Letters Patent of the United States is:—

1. The combination with a continuous conveyor adapted to receive highly heated glass articles thereon directly from a forming machine and transfer said articles directly to an annealing leer while presenting a minimum of contact surface directly to the bottoms of said articles, of weighing and checking apparatus having a weighing table and associated with a portion of said conveyor intermediate the extremities thereof at one or both sides of the same, which apparatus is provided with a tripper disposed across the conveyor, a stationary article support, clutch means actuated upon the tripper being engaged by an article on the conveyor, cam operated pusher members operating in a predetermined sequence in order to first shift each article from the conveyor on to said support, then further shift the article on to the table of said weighing apparatus and afterwards return said article to the conveyor, a shiftable deflector adapted to assume either a position at the side of the conveyor or an inclined position across the conveyor beyond said tripper, and means for selectively controlling and determining the position of said deflector according to the weight of the article and the movement of the weighing table.

2. The combination with a continuous conveyor adapted to receive highly heated glass articles thereon directly from a forming machine and transfer said articles directly to an annealing leer while presenting a minimum of contact surface directly to the bottoms of said articles, of weighing and checking apparatus having a weighing table and associated with a portion of said conveyor intermediate the extremities thereof at one or both sides of the same, a tripper disposed across the conveyor and adapted to be successively engaged by the articles as they are carried along, and means operated upon actuation of the tripper adapted to both shift an article from the conveyor onto the table of the weighing apparatus and thereafter shift said article back again upon said conveyor beyond said tripper while the bottom of the article is uninterruptedly supported, a shiftable article removing device, and means actuated by the table of said weighing apparatus for determining the position of said article removing device beyond said tripper in order to remove the returned articles having incorrect weight and allow the articles of predetermined weight to proceed unobstructed, said apparatus uninterruptedly supporting said articles beneath the bottoms thereof during the entire course of the transfer of the same from the beginning of said conveyor to the point at which they are finally removed therefrom.

THOMAS WARDLEY.